United States Patent
Giuliano et al.

(10) Patent No.: US 12,244,242 B2
(45) Date of Patent: Mar. 4, 2025

(54) SWITCHED CAPACITORS FOR AC-DC APPLICATIONS

(71) Applicant: pSemi Corporation, San Diego, CA (US)

(72) Inventors: David M. Giuliano, Brookline, MA (US); David Kunst, Cupertino, CA (US)

(73) Assignee: pSemi Corporation, San Diego, CA (US)

( * ) Notice: Subject to any disclaimer, the term of this patent is extended or adjusted under 35 U.S.C. 154(b) by 0 days.

(21) Appl. No.: 17/646,875

(22) Filed: Jan. 4, 2022

(65) Prior Publication Data

US 2022/0337170 A1    Oct. 20, 2022

Related U.S. Application Data

(63) Continuation of application No. 16/077,827, filed as application No. PCT/US2017/018144 on Feb. 16, 2017, now Pat. No. 11,258,371.

(60) Provisional application No. 62/295,660, filed on Feb. 16, 2016.

(51) Int. Cl.
　　*H02M 7/217*　　(2006.01)
　　*H02M 1/00*　　(2007.01)
　　*H02M 1/42*　　(2007.01)
　　*H02M 3/07*　　(2006.01)

(52) U.S. Cl.
　　CPC ....... *H02M 7/2176* (2013.01); *H02M 1/4208* (2013.01); *H02M 3/07* (2013.01); *H02M 1/007* (2021.05)

(58) Field of Classification Search
　　CPC ...... H02M 7/2176; H02M 1/007; H02M 3/07; H02M 1/0083; H02M 1/0095
　　See application file for complete search history.

(56) References Cited

U.S. PATENT DOCUMENTS

| | | | |
|---|---|---|---|
| 5,991,169 A | * | 11/1999 | Kooken ............. H02M 1/4208 363/17 |
| 6,329,796 B1 | | 12/2001 | Popescu |
| 8,423,800 B2 | | 4/2013 | Huang |
| 8,693,224 B1 | | 4/2014 | Giuliano |

(Continued)

FOREIGN PATENT DOCUMENTS

| | | |
|---|---|---|
| JP | 2008-118517 | 5/2008 |
| JP | 2013-034298 | 2/2013 |

(Continued)

OTHER PUBLICATIONS

Sun—"High Power Density, High Efficiency System Two-Stage Power Architecture for Laptop Computers" Power Electronic Specialists Conference, pp. 1-7, Jun. 18, 2006, Doc 7596.

(Continued)

*Primary Examiner* — Gustavo A Rosario-Benitez
(74) *Attorney, Agent, or Firm* — .Haynes and Boone, LLP

(57) ABSTRACT

An apparatus for conversion between AC and DC voltages includes a rectifier and first and second stages coupled to each other and having a regulator and a switched-capacitor circuit respectively. The first stage receives a first voltage from the rectifier and the second stage provides a second voltage. A controller controls the first and second stages.

33 Claims, 8 Drawing Sheets

(56) References Cited

U.S. PATENT DOCUMENTS

| | | | |
|---|---|---|---|
| 8,723,491 B2* | 5/2014 | Giuliano | G05F 1/10 |
| | | | 323/272 |
| 8,817,501 B1* | 8/2014 | Low | H02M 3/07 |
| | | | 363/59 |
| 9,374,001 B1* | 6/2016 | Subramaniam | H02M 1/42 |
| 10,389,244 B2 | 8/2019 | Le et al. | |
| 2004/0217749 A1* | 11/2004 | Orr | H02M 3/33569 |
| | | | 323/299 |
| 2007/0182368 A1 | 8/2007 | Yang | |
| 2009/0033293 A1 | 2/2009 | Xing | |
| 2011/0051476 A1* | 3/2011 | Manor | H02M 3/335 |
| | | | 363/65 |
| 2011/0148385 A1 | 6/2011 | North | |
| 2012/0250360 A1 | 10/2012 | Orr | |
| 2013/0044519 A1* | 2/2013 | Teraura | H02M 3/33584 |
| | | | 363/17 |
| 2013/0094157 A1* | 4/2013 | Giuliano | H01L 25/16 |
| | | | 361/748 |
| 2013/0201729 A1* | 8/2013 | Ahsanuzzaman | |
| | | | H02M 3/33507 |
| | | | 363/21.12 |
| 2013/0229841 A1* | 9/2013 | Giuliano | H02M 1/4225 |
| | | | 363/60 |
| 2013/0279224 A1 | 10/2013 | Ofek | |
| 2013/0322126 A1* | 12/2013 | Pan | H02M 3/3353 |
| | | | 363/17 |
| 2014/0022005 A1 | 1/2014 | Ramanan | |
| 2014/0092643 A1 | 4/2014 | Luccato | |
| 2015/0036395 A1* | 2/2015 | Orr | H02M 7/4807 |
| | | | 363/34 |
| 2015/0103567 A1* | 4/2015 | Wang | H02M 3/33592 |
| | | | 363/21.13 |
| 2015/0131330 A1* | 5/2015 | Pan | H02M 3/33584 |
| | | | 363/17 |
| 2015/0222192 A1 | 8/2015 | Freeman et al. | |
| 2015/0318685 A1 | 11/2015 | Hsieh | |
| 2015/0357912 A1* | 12/2015 | Perreault | H02M 3/33569 |
| | | | 363/126 |
| 2016/0190933 A1 | 6/2016 | Lee | |

FOREIGN PATENT DOCUMENTS

| | | |
|---|---|---|
| JP | 2013065939 | 4/2013 |
| KR | 20120010636 | 2/2012 |
| KR | 10-2013-0066266 | 6/2013 |
| WO | WO2017160821 | 9/2017 |

OTHER PUBLICATIONS

PCT/US2017/022281 / 400.P024PCT: Patent Application filed Mar. 14, 2017 (30096-024WO1) 34 pages, Doc 8047.

PCT/US2017/022281 / 400.P024PCT: Intl Search Report and Written Opinion dated Jun. 7, 2017 (30096-024WO1) 13 pages, Doc 8049.

PCT/US2017/022281 / 400.P024PCT: Article 19 Amendment filed Aug. 7, 2017 (30096-024WO1) 9 pages, Doc 8048.

PCT/US2017/022281 / 400.P024PCT: Intl Preliminary Report on Patentability dated Sep. 18, 2018 (30096-024WO1) 11 pages, Doc 8051.

* cited by examiner

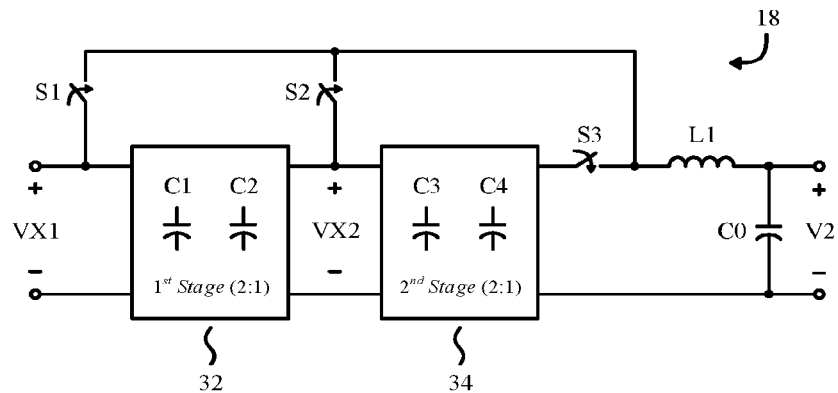
FIG. 3
| Item | Total Value | Comp. Size (W x L x H) | Quantity |
|---|---|---|---|
| L1 | 120 nH | 4.00 x 4.00 x 1.20 mm$^3$ | 1 |
| C0 | 40 µF | 1.60 x 0.80 x 1.00 mm$^3$ | 8 |
| C1 | 10 µF | 2.00 x 1.25 x 1.25 mm$^3$ | 2 |
| C2 | 10 µF | 2.00 x 1.25 x 1.25 mm$^3$ | 2 |
| C3 | 10 µF | 2.00 x 1.25 x 1.25 mm$^3$ | 1 |
| C4 | 10 µF | 2.00 x 1.25 x 1.25 mm$^3$ | 1 |
FIG. 4
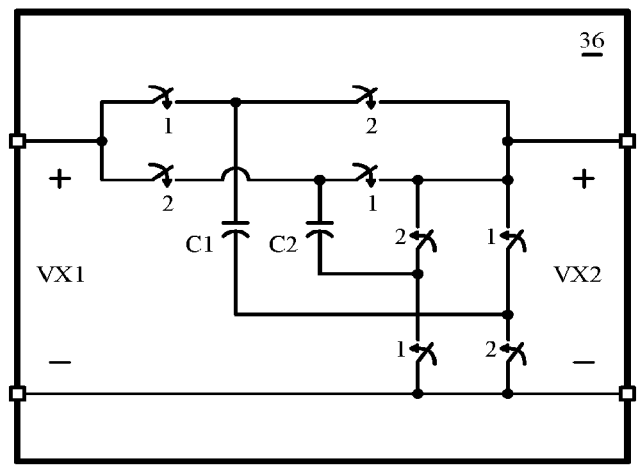
FIG. 5

| Item | Nominal Si die | Larger Si die |
|---|---|---|
| Peak Efficiency | 98.27% | 98.29% |
| Full-load Efficiency | 97.98% | 98.24% |
| Passive Footprint Area | 48.44 mm$^2$ | 48.44 mm$^2$ |
| Solution Footprint Area | 60.46 mm$^2$ | 64.40 mm$^2$ |

| Item | Total Value | Comp. Size (W x L x H) | Quantity |
|---|---|---|---|
| L1 | 120 nH | 4.00 x 4.00 x 1.20 mm$^3$ | 1 |
| C0 | 40 µF | 1.60 x 0.80 x 1.00 mm$^3$ | 8 |
| C1 | 5 µF | 1.60 x 0.80 x 1.00 mm$^3$ | 5 |
| C2 | 5 µF | 1.60 x 0.80 x 1.00 mm$^3$ | 5 |
| C3 | 10 µF | 2.00 x 1.25 x 1.25 mm$^3$ | 2 |
| C4 | 10 µF | 2.00 x 1.25 x 1.25 mm$^3$ | 2 |
| C5 | 10 µF | 2.00 x 1.25 x 1.25 mm$^3$ | 1 |
| C6 | 10 µF | 2.00 x 1.25 x 1.25 mm$^3$ | 1 |

State 1

State 2

State 3

State 4

State 1

State 2

State 3

State 4

SWITCHED CAPACITORS FOR AC-DC APPLICATIONS

RELATED APPLICATIONS

This application is a continuation of U.S. patent application Ser. No. 16/077,827 filed Aug. 14, 2018, issued as U.S. Pat. No. 11,258,371, and entitled "SWITCHED CAPACITORS FOR AC-DC APPLICATIONS," which is a national phase under 35 USC 371 of International Application No. PCT/US2017/018144 filed Feb. 16, 2017, which claims the benefit of the Feb. 16, 2016 filing date of U.S. Provisional Patent Application No. 62/295,660, the contents of which are herein incorporated by reference.

FIELD OF INVENTION

This invention relates to power conversion, and in particular, to power converters that use switched capacitors.

BACKGROUND

Many portable electrical devices must be charged from an AC source. This requires a converter that, among other things, transforms the AC into DC suitable for charging the device. The need to perform such conversion introduces loss in the power-conversion circuit itself.

SUMMARY

The invention relates generally to adiabatic switched capacitor circuits that can be used with a high-voltage switch-mode regulator for use in adaptive charging.

In one aspect, the invention features an apparatus for converting between AC voltage and DC voltage. Such an apparatus a rectifier coupled to a first stage that receives a first voltage from the rectifier and that is coupled to a second stage that provides a second voltage. The first stage includes a regulator and the second stage includes a switched-capacitor converter. A controller controls the first and second stages.

In some embodiments, the first stage includes a pre-regulating circuit, such as a fly back converter.

Further embodiments include those in which the second stage comprises a two-stage switched-capacitor circuit having bypass switches for switching first and second stages thereof into or out of the switched-capacitor circuit during operation, thereby achieving different voltage conversion ratios, those in which the second stage comprises a three-stage switched-capacitor circuit having bypass switches for switching first, second, and third stages thereof into or out of the switched-capacitor circuit during operation, thereby achieving different voltage conversion ratios, and those in which the second stage comprises a single-stage switched-capacitor circuit having switches that transition between switch states so as to cause the switched-capacitor circuit to operate at different voltage conversion ratios. Among these are embodiments in which the switches transition between at least three switch states.

In some embodiments, the controller comprises a primary side section and a secondary side section. In such embodiments, the primary side section controls a switch that selectively passes current through a primary winding of a transformer and the secondary side controls the second stage.

Other embodiments include a voltage divider for interfacing between the first and second stages. Among these are embodiments in which the voltage divider is a constituent of the first stage and those in which it is a constituent of the second stage.

In some embodiments, the controller includes an isolation barrier between a primary and secondary section thereof.

In other embodiments, the regulator includes an isolated regulator. Examples of such an isolated regulator include a magnetically-isolated regulator, an electrically-isolated regulator, a galvanically-isolated regulator, an optically-isolated regulator, and an electromagnetically-isolated regulator.

Among the magnetically-isolated regulators that can be used is one that includes a fly-back converter. Examples of a fly-back converter include a quasi-resonant fly-back converter, an interleaved fly-back converter, a two-switch fly-back converter, and an active-clamp fly-back converter.

The magnetically-isolated regulator can also include a forward converter. Examples of a forward converter include a multi-resonant forward converter, an active-clamp forward converter, and a two-switch forward converter.

In some embodiments, the magnetically-isolated regulator includes a half-bridge converter. Examples of a half-bridge converter include an asymmetric half-bridge converter, a multi-resonant half-bridge converter, and an LLC resonant half-bridge converter.

In other embodiments, the magnetically-isolated regulator includes a full-bridge converter.

In some embodiments, the regulator is a non-isolated regulator. Examples of suitable non-isolated regulators include a boost converter, a buck-boost converter, and a buck converter.

Also among the embodiments are those in which the regulator includes a first functional component and a second functional component. In these embodiments, the first and second functional components communicate energy between them with no electrical conduction between them. Some of these embodiments include an intermediary that enables communication of energy between the first and second functional components. In some cases, the energy is stored in a magnetic field.

Also among the embodiments are those in which the switched-capacitor converter includes an adiabatic circuit.

In other embodiments, the switched-capacitor converter is one that, during operation thereof, causes at least one capacitor therein to experience a change in charged stored therein by causing charge to be passed through a non-capacitive element.

Other embodiments include those in which the switched-capacitor converter includes a multi-phase network and those in which it a cascade multiplier. Such a cascade multiplier can be diabatic or adiabatic.

Yet other embodiments include those in which the switched-capacitor converter includes a ladder network, those in which it includes a Dickson network, those in which it includes a series-parallel network, those in which it includes a Fibonacci network, and those in which it includes a doubler network.

In some embodiments, the regulator includes a transformer. Among these are embodiments in which a switch controls flow of current through one side of the transformer. This switch would typically be under the control of the controller. Also among these embodiments are those that have a diode transitions between conducting and non-conducting states in response to operation of the switch.

In some embodiments, the converter is a constituent of another device, such as a travel adapter or a wall plug. Examples of such travel adapters or wall plugs are those that have a USB port. In such embodiments, travel adapter receives an AC voltage and outputs a DC voltage at the USB port.

In some embodiments, the second stage operates in discrete steps for providing coarse adjustment of an input voltage and wherein the first stage provides fine adjustment of an input voltage.

Also among the embodiments are those in which the rectifier includes a bridge rectifier. Among these embodiments are those in which the bridge rectifier includes bridge diodes and a bridge capacitor, with the bridge diodes being arranged to form the bridge. During the operation of such embodiments, an output of the bridge is present across the bridge capacitor.

Other embodiments include such features as active power-factor circuitry, a fuse disposed to prevent excess current within the AC to DC converter, and an electromagnetic interference filter disposed to suppress radiation generated during operation of the AC to DC converter.

Embodiments also include those in which the controller alters a duty cycle or switching frequency in at least one switch in at least one of the stages, and those in which the controller is a feedback controller that adjusts switching frequencies of one or more switches in the first and second stages based on a measurement of at least one of a voltage and current within the AC to DC converter.

In some embodiments, the second stage includes bypass switches that are configured to transition between different bypass-switch configurations, and a plurality of switched-capacitor stages. In such embodiments, each bypass-switch configuration results in a different combination of the switched-capacitor stages forming the switched-capacitor circuit. Among these embodiments are those that have a controller to cause transitions of the bypass switches into different bypass-switch configurations.

In some embodiments, the wherein second stage includes a network of switched-capacitor networks. These can be interconnected to form different switched-capacitor circuits. Among these are embodiments in which the switched switched-capacitor-network network includes a set of bypass switches that interconnect a set of switched-capacitor networks. These bypass switches are configured to transition between bypass-switch states, wherein each bypass-switch state corresponds to a different interconnection of switched-capacitor networks. Some of these embodiments feature a controller configured to cause the bypass switches to transition between different bypass-switch configurations.

Other embodiments of the invention include various combinations of the foregoing features.

In another aspect, the invention features a computer-accessible storage medium that includes a database representative of one or more components of the apparatus described above. For example, the database may include data representative of a switching network that has been optimized to promote low-loss operation of a charge pump.

Generally speaking, a computer accessible storage medium includes any non-transitory storage media accessible by a computer during use to provide instructions and/or data to the computer. For example, a computer accessible storage medium may include storage media such as magnetic or optical disks and semiconductor memories.

Software stored on such a medium falls into two sets: a first set that consists of software per se and a second set that is the complement of the first set. The claims are deemed to cover only the complement of the first set.

Generally, a database representative of the system may be a database or other data structure that can be read by a program and used, directly or indirectly, to fabricate the hardware comprising the system. For example, the database may be a behavioral-level description or register-transfer level (RTL) description of the hardware functionality in a high level design language (HDL) such as Verilog or VHDL. The description may be read by a synthesis tool that may synthesize the description to produce a netlist comprising a list of gates from a synthesis library. The netlist comprises a set of gates that also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. In other examples, Alternatively, the database may itself be the netlist (with or without the synthesis library) or the data set.

In another aspect, the invention features a method that include converting an AC voltage into a DC voltage by providing the AC voltage to a rectifier that is coupled to a first stage that includes a regulator, the regulator being coupled to a second stage that includes a switched-capacitor converter and controlling operation of the first and second stages to cause the second stage to output a DC voltage having a desired value.

These and other features of the invention will be apparent from the following detailed description and the accompanying figures, in which:

BRIEF DESCRIPTION OF THE FIGURES

FIG. 3 shows a first embodiment of a switched-capacitor architecture for use in the power-conversion circuits of FIGS. 1 and 2;

FIG. 4 is a parts list for the embodiment shown in FIG. 3;

FIG. 5 shows a switching circuit contained in the stages of the power-conversion circuit of FIGS. 1 and 2;

DETAILED DESCRIPTION

Figure 1:
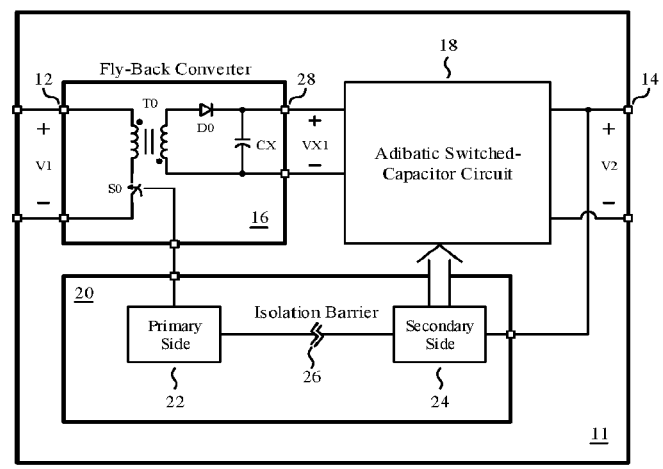
FIG. 1 shows a two-stage power-conversion circuit.

FIG. 1 shows a two-stage power-conversion circuit 11 having a first terminal 12 that connects to the first stage and a second terminal 14 that connects to a second stage. The first terminal 12 is at a first voltage V1 and the second terminal 14 is at a second voltage V2.

In the illustrated embodiment, the first stage is implemented as a switch-mode pre-regulator 16 and the second stage is implemented as an adiabatic switched-capacitor circuit 18. However, in alternative embodiments, this second stage is non-adiabatic, or diabatic.

The pre-regulator 16 can be implemented in a variety of ways, so long as the essential function thereof, namely regulation of an output voltage, can be carried out. In the illustrated embodiment, the pre-regulator 16 includes a pre-regulator switch S0, a transformer TO, a diode DO, and a filter capacitor CX. A particularly useful implementation of a pre-regulator 16 is a magnetically-isolated converter, an example of which is a fly-back converter.

A variety of fly-back converters can be used to implement the pre-regulator 16. These include a quasi-resonant fly-back converter, an active-clamp fly-back converter, an interleaved fly-back converter, and a two-switch fly-back converter.

Other examples of magnetically-isolated converters are forward converters. Examples of suitable forward converters include a multi-resonant forward converter, an active-clamp forward converter, an interleaved forward converter, and a two-switch forward converter.

Yet other examples of magnetically-isolated converters are half-bridge converters and full-bridge converters. Examples of half-bridge converters include an asymmetric half-bridge converter, a multi-resonant half-bridge converter, and an LLC resonant half-bridge converter. Examples of full-bridge converters include an asymmetric full-bridge converter, a multi-resonant full-bridge converter, and an LLC resonant full-bridge converter.

It is also possible to implement the pre-regulator 16 using a non-isolated converter. Examples include a buck converter, a boost converter, and a buck-boost converter.

As used herein, two functional components are said to be "isolated," or more specifically, "galvanically isolated," if energy can be communicated between those components without a direct electrical conduction path between those components. Such isolation thus presupposes the use of another intermediary for communicating energy between the two components without having actual electrical current flowing between them. In some cases, this energy may include information.

Examples include the use of a wave, such as an electromagnetic, mechanical, or acoustic wave. As used herein, electromagnetic waves include waves that are in span the visible range, the ultraviolet range, and the infrared range. Such isolation can also be mediated through the use of quasi-static electric or magnetic fields, capacitively, inductively, or mechanically.

Most functional components have circuitry in which different parts of the circuit are at different electrical potentials. However, there is always a potential that represents the lowest potential in that circuit. This is often referred to as "ground" for that circuit.

When a first and second functional component are connected together, there is no guarantee that the electrical potential that defines ground for the first component will be the same as the electrical potential that defines ground for the second circuit. If this is the case, and if these components are connected together, it will be quite possible for electrical current to flow from the higher of the two grounds to the lower of the two grounds. This condition, which is called a "ground loop," is undesirable. It is particularly undesirable if one of the two components happens to be a human being. In such cases, the current in the ground loop may cause injury.

Such ground loops can be discouraged by galvanically isolating the two components. Such isolation essentially forecloses the occurrence of ground loops and reduces the likelihood that current will reach ground through some unintended path, such as a person's body.

The switched-capacitor circuit 18 can be implemented as a switched-capacitor network. Examples of such networks include ladder networks, Dickson networks, Series-Parallel networks, Fibonacci networks, and Doubler networks. These can all be adiabatically charged and configured into multi-phase networks. A particularly useful switched-capacitor network is an adiabatically charged version of a full-wave cascade multiplier. However, diabatically charged versions can also be used.

As used herein, changing the charge on a capacitor "adiabatically" means causing an amount of charge stored in that capacitor to change by passing the charge through a non-capacitive element. A positive adiabatic change in charge on the capacitor is considered adiabatic charging while a negative adiabatic change in charge on the capacitor is considered adiabatic discharging. Examples of non-capacitive elements include inductors, magnetic elements, resistors, and combinations thereof.

In some cases, a capacitor can be charged adiabatically for part of the time and diabatically for the rest of the time. Such capacitors are considered to be adiabatically charged. Similarly, in some cases, a capacitor can be discharged adiabatically for part of the time and diabatically for the rest of the time. Such capacitors are considered to be adiabatically discharged.

Diabatic charging includes all charging that is not adiabatic and diabatic discharging includes all discharging that is not adiabatic.

As used herein, an "adiabatic switched-capacitor circuit" is a network having at least one capacitor that is both adiabatically charged and adiabatically discharged. A "diabatic switched-capacitor circuit" is a network that is not an adiabatic switched-capacitor circuit.

Examples of pre-regulators 16, switched-capacitor circuits 18, their accompanying circuitry, and packaging techniques can be found U.S. Pat. Nos. 9,362,826, 9,497,854, 8,723,491, 8,503,203, 8,693,224, 9,502,968, 8,619,445, 9,203,299, and 9,041,459, U.S. Patent Publications 2016/0197552, 2015/0102798, 2014/0301057, 2013/0154600, 2015/0311786, 2014/0327479, 2016/0028302, 2014/0266132, 2015/0077175, and 2015/0077176, and PCT publications WO2014//062279, WO2015//138378, WO2015//138547, WO2016//149063, and WO 2017/007991, the contents of which are herein incorporated by reference.

A controller 20 controls the operation of the first and second stages. The controller 20 includes a primary side 22 that controls the first stage and a secondary side 24 that controls the second stage. An isolation barrier 26 separates the primary side 22 from the secondary side 26.

The primary side 22 of the controller 20 controls the pre-regulator switch S0. Opening and closing the pre-regulator switch S0 controls the current provided to a primary side of the transformer TO. This, in turn, controls the voltage across the filter capacitor CX. When the pre-regulator switch S0 is on, the diode DO is off and when the pre-regulator switch S0 is off, the diode DO is on.

The pre-regulator 16 also includes a regulator-output terminal 28 maintained at an intermediate voltage VX1 that is lower than the first voltage V1. This regulator-output terminal 28 connects to the adiabatic switched capacitor circuit 18. The adiabatic switched capacitor circuit 18 thus receives this intermediate voltage VX1 and transforms it into the second voltage V2.

The switched-capacitor circuit 18 operates in discrete steps. Thus, it only provides coarse regulation of its output. It cannot provide fine regulation of its output. It is for the pre-regulator 16 to carry out this fine regulation. The two-stage design shown in FIG. 1 reduces the need for the pre-regulator 16 to sustain a high-current burden. This means that the secondary winding of the transformer TO can instead carry a much smaller RMS current. This, in turn, lowers winding loss and reduces the voltage ripple at the regulator-output terminal 28. It also means that the filter capacitor CX that couples the pre-regulator 16 to the switched-capacitor circuit 18 can be made smaller.

However, the improved performance of the pre-regulator 16 cannot be completely offset by the increased size and power loss of having the switched-capacitor circuit 18 in the second stage. Therefore, it is imperative that the switched-capacitor circuit 18 be both extremely efficient and small.

Figure 2:
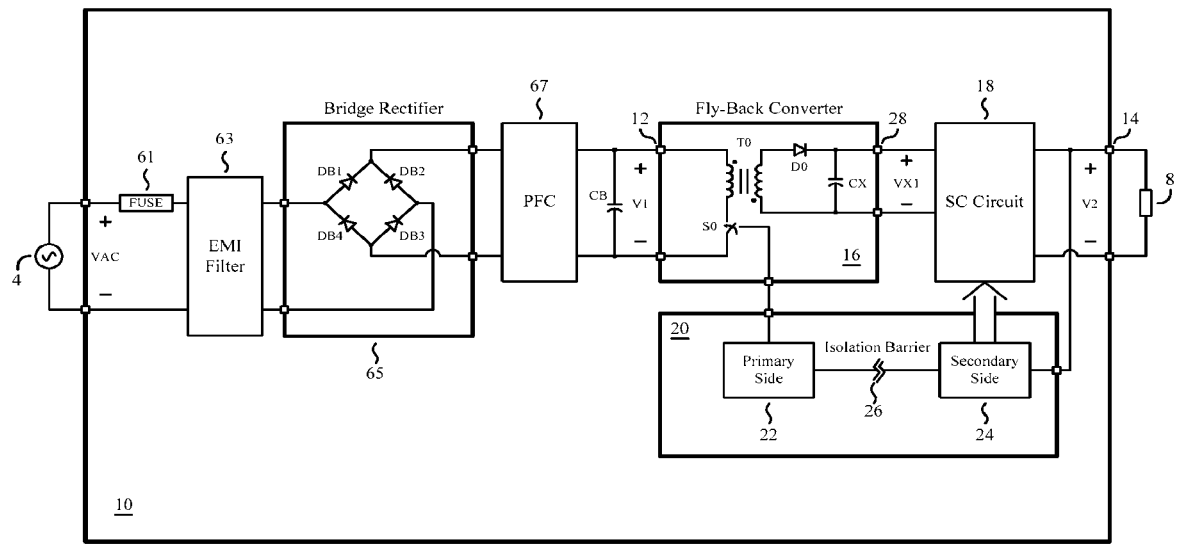
FIG. 2 shows the circuit of FIG. 1 with additional circuitry for receiving an AC voltage.
Figure 16:
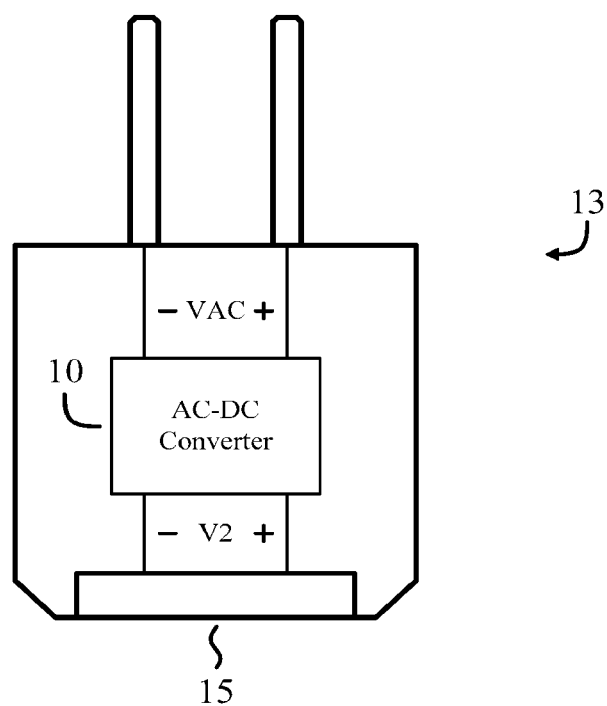
FIG. 16 shows the circuit of FIG. 2 incorporated into a travel adapter.

FIG. 2 shows a power-conversion circuit 10 similar to that shown in FIG. 1 but with additional circuitry for receiving an AC voltage VAC provided by an AC source 4 and converting that AC voltage VAC into the second voltage V2. The AC voltage VAC is provided to input terminals of a bridge rectifier 65 having bridge diodes DB1, DB2, DB3, and DB4 arranged to form a bridge and having an output across a bridge capacitor CB. The output across the bridge capacitor CB becomes the first voltage V1 presented at the first terminal 12. A power-conversion circuit 10 of this type may be incorporated into a travel adapter 13, as shown in FIG. 16. Such a travel adapter 13 outputs a DC voltage at a USB port 15.

Some embodiment include circuitry for controlling harmonic current and thus boosting the ratio of real power to apparent power that flows through the power supply. This is particularly useful for power supplies that attach to a wall outlet that supplies an AC voltage. An example of such circuitry is an active power-factor corrector 67 disposed between the bridge rectifier 65 and the pre-regulator 16.

FIG. 2 also shows a fuse 61 between the AC power source 4 and the remaining components of the power-conversion circuit 10 for safety. An electromagnetic interference filter 63 is also provided to suppress the uncontrolled emission of electromagnetic waves that may arise during operation of the power-conversion circuit 10.

FIG. 3 shows a first embodiment of a switched-capacitor circuit 18 that is designed to accept a nominal voltage of 20 volts and to produce a variety of output voltages, such as 5 volts and 10 volts. This is particularly useful for Type-C travel adapters. This is because, unlike the older USB standards, in which the output is always five volts, the newer USB Type C standard permits higher output voltages, such as ten, fifteen, and even twenty volts.

The illustrated switched-capacitor circuit 18 features a first switched-capacitor stage 32, a second switched-capacitor stage 34, a first bypass-switch S1, a second bypass-switch S2, and a third bypass-switch S3. An LC filter having an output inductor L1 and an output capacitor C0 permit adiabatic operation. By selectively opening and closing the bypass-switches S1, S2, S3, it is possible to selectively bypass selected ones of the first and second switched-capacitor stages 32, 34.

Each of the first and second stages 32, 34 is a 2× voltage divider having a maximum voltage conversion from VX1 to VX2 of 4:1. The resulting switched-capacitor circuit 18 is designed to accept an intermediate voltage VX1 of 20 volts and to provide an output voltage V2 of either 20 volts, 10 volts, or 5 volts. Some embodiments deliver an 15 volt output voltage, which is sometimes required by the Type-C standard. This can be provided by having the pre-regulator 16 deliver 15 volts to the switched-capacitor circuit 18 instead of 20 volts and running the switched-capacitor circuit 18 in the 1:1 mode.

The switched-capacitor circuit 18 shown in FIG. 3 has three modes of operation, a 1:1 mode, a 2:1 mode, and a 4:1 mode.

In the 1:1 mode, the first bypass-switch S1 closes, and the second and third bypass-switches S2 and S3 open.

In the 2:1 mode, the second bypass-switch S2 closes and the first and third bypass-switches S1 and S3 open.

In the 4:1 mode, the third bypass-switch S3 closes and the first and second bypass-switches S1 and S2 open. All bypassed stages run in a low-power mode to save power since they are not needed to provide voltage conversion (i.e., they are not switching at a specific frequency).

FIG. 4 shows a component list for one implementation of the switched-capacitor circuit 18 shown in FIG. 3. The components were selected so the solution provides a high efficiency, a small solution size, and a maximum output voltage ripple of 100 mV peak-to-peak. The total value column specifies the total amount of inductance and/or capacitance required of the components at their operating condition. For example, capacitor C3 has a nominal dc bias of 5 volts, therefore, a 22 µF capacitor was selected because it provides approximately 10 µF under this condition.

FIG. 5 illustrates a circuit 36 inside the first stage. A similar circuit is within the second stage. During operation, this circuit transitions between first and second states. In the first state, all switches labeled "1" close and all switches labeled "2" open. In the second state, all switches labeled "1" open and all switches labeled "2" close. The circuit 36 alternates between the first and second state at a specific frequency that is selected to produce a second intermediate voltage VX2 that is half of the intermediate voltage VX1.

Figure 6:
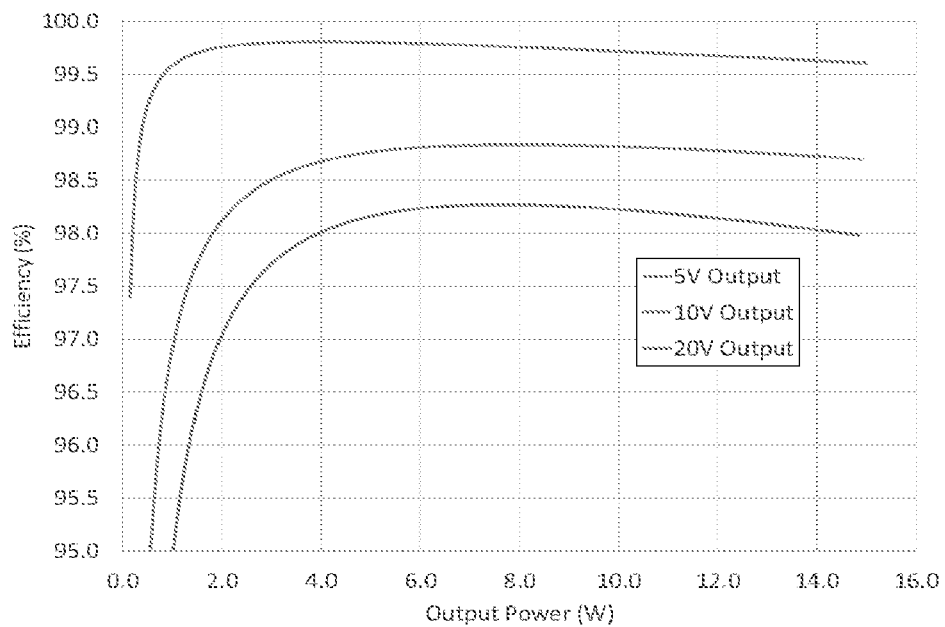
FIGS. 6 and 7 show operational efficiency of the power-conversion circuit that uses the first embodiment as its second stage made on two different dies with different sizes.
Figure 7:
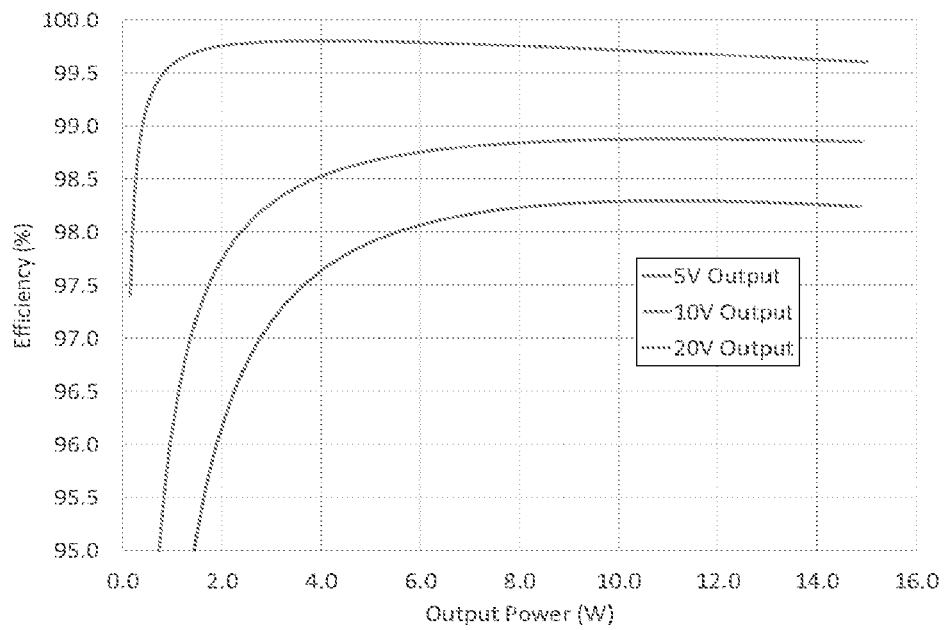

FIGS. 6 and 7 illustrate the predicted efficiency across output power for operation in the 2:1 mode and in the 4:1 mode at an intermediate voltage VX1 of 20 volts for two different die sizes. FIG. 6 is fora nominal die and FIG. 7 is for a larger die. Since the efficiency at full-load is dominated by resistive losses, the larger silicon die size will result in improved performance. In some, but not all embodiments, a nominal die is 12 mm$^2$ and a larger die is 16 mm$^2$ It is worth noting that the power loss in the second stage is approximately equal to the power loss in the first stage. This results in a larger percentage of the die being consumed by the second stage. Furthermore, the efficiency of the 5-volt output configuration is not equal to the square of the efficiency of the 10-volt output configuration because some losses are common to both stages.

Figures 8, 9, 10:
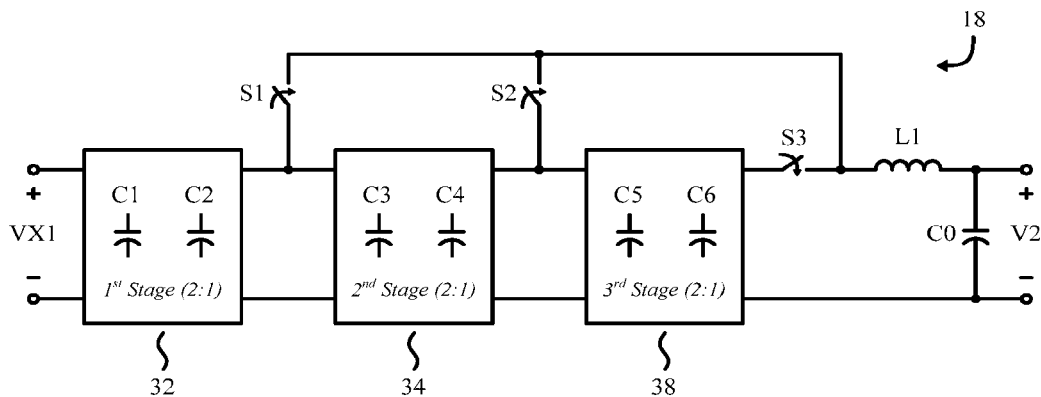
FIG. 8 shows the efficiencies associated with the circuits used in FIGS. 6 and 7.
FIG. 9 shows a second embodiment of a switched-capacitor architecture for use in the power-conversion circuits of FIGS. 1 and 2.
FIG. 10 is a parts list for the embodiment shown in FIG. 9.

FIG. 8 summarizes performance at an intermediate voltage VX1 of 20 volts and an output voltage T72 of 5 volts. The passive footprint area is calculated by adding up the area of all of the passive components and adding 0.2 mm of space between them. The solution footprint area is the sum of the silicon die and the passive footprint area. As can be seen from the table, the full-load efficiency is higher with the larger die size. The maximum height is 1.25 mm through the exclusive use of SMT components.

Unlike, conventional switched-capacitor converters, the architecture disclosed herein includes an LC filter that enables adiabatic charging and discharging of the capacitors within each switched-capacitor stage. This adiabatic operation permits high efficiencies at small solution sizes.

FIG. 9 illustrates another embodiment of the switched-capacitor circuit 18 that is similar to that shown in FIG. 3. However, unlike in the switched-capacitor circuit 18 shown in FIG. 3, the one shown in FIG. 9 accepts an intermediate voltage VX1 of 40 volts instead of 20 volts.

To achieve this requirement, the switched-capacitor circuit 18 includes a third switched-capacitor stage 38. As before, an output voltage V2 of either 20 volts, 10 volts, or 5 volts. However, the operating modes are now a 2:1 mode, a 4:1 mode, and an 8:1 mode. Remaining details on the structure and operation of the embodiment shown in FIG. 8 are similar to those for FIG. 3 and are omitted for brevity.

FIG. 10 shows a component list for one implementation of the switched-capacitor circuit 18 shown in FIG. 8.

Figure 11:
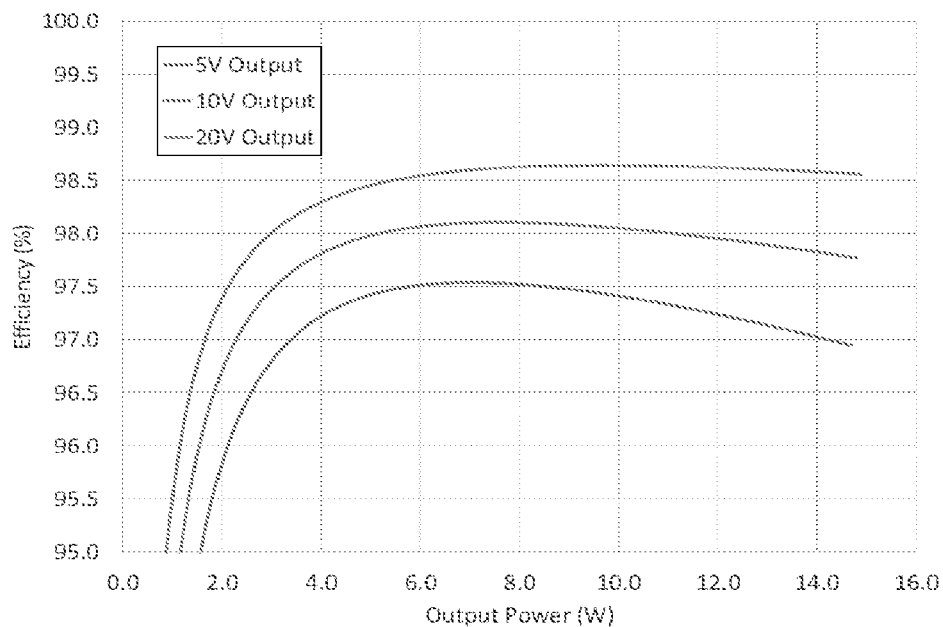
FIGS. 11 and 12 show operational efficiency of the power-conversion circuit of FIG. 9 that uses the second embodiment as its second stage made on two different dies with different sizes.
Figure 12:
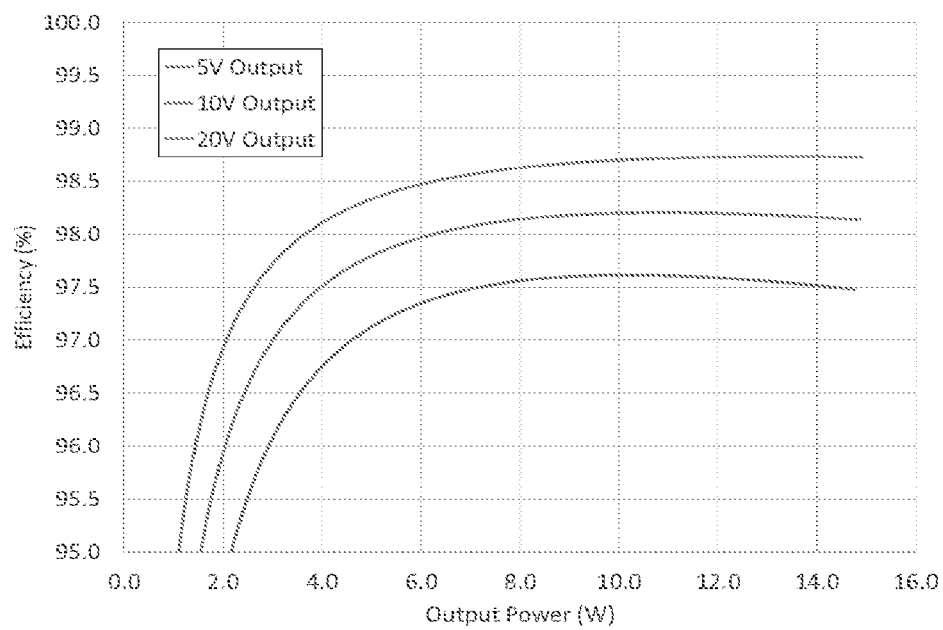

FIGS. 11 and 12 show predicted efficiency across output power for modes 2:1, 4:1, and 8:1 at an intermediate voltage VX1 of 20 volts.

Figure 13:
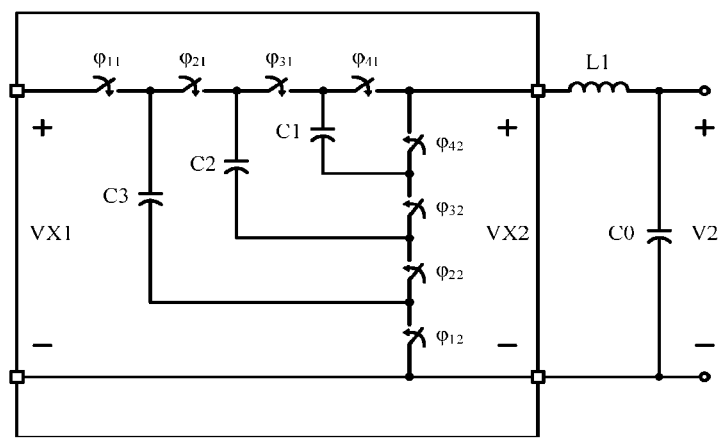
FIG. 13 shows a third embodiment of a switched-capacitor architecture for use in the power-conversion circuits of FIGS. 1 and 2.

FIG. 13 shows an embodiment of a switched-capacitor circuit 18 that avoids the use of multiple switched-capacitor stages and bypass switches. Instead, it relies on a single switched-capacitor stage. To achieve the various voltage conversion ratios, the embodiment shown in FIG. 13 uses different switching patterns for different voltage conversion ratios. Another difference between the embodiment shown in FIG. 13 and that shown in FIGS. 3 and 9 is that the embodiment shown in FIG. 13 cycles between four distinct states instead of two distinct states. Like the first and second embodiments, this third embodiment also has an LC filter at its output enabling adiabatic charging and discharging of the capacitors C1-C3.

Figure 14:
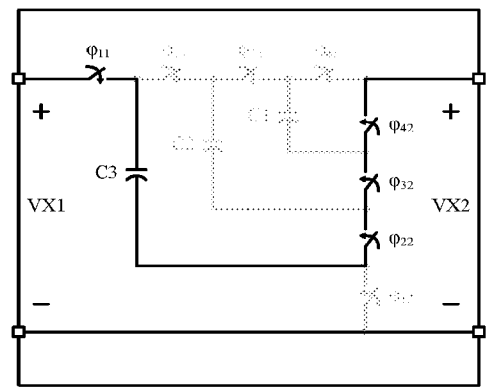
FIGS. 14 and 15 show switching patterns for operation of the embodiment shown in FIG. 13.
Figure 14:
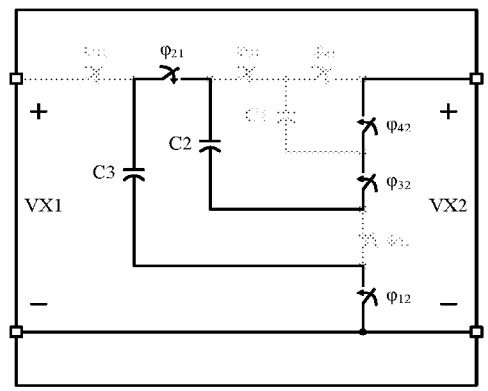
Figure 14:
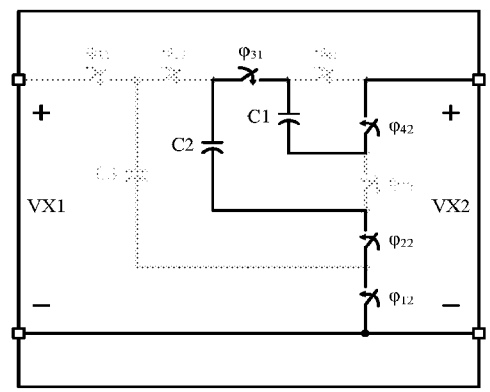
Figure 14:
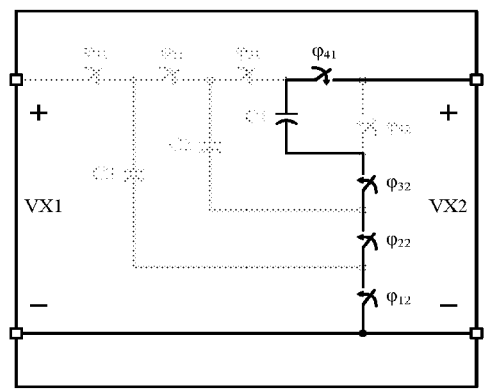
Figure 15:
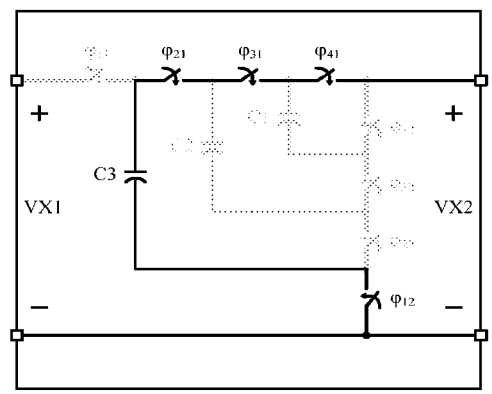
Figure 15:
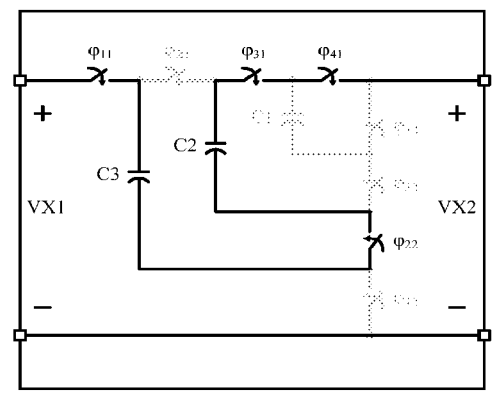
Figure 15:
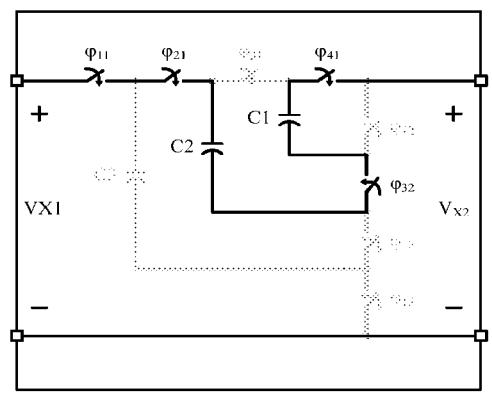
Figure 15:
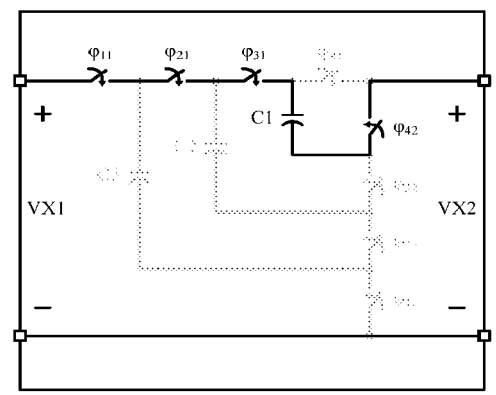

The third embodiment of the switched-capacitor circuit 18 can receive an intermediate voltage VX1 of 20 volts and produce a voltage of 20 volts, 15 volts, 10 volts, or 5 volts. For example, if the intermediate voltage VX1 is 20 volts, FIGS. 14 and 15 illustrate the corresponding four states required to produce an output voltage VX2 of 5 volts and 15 volts, respectively. For best performance, it is preferable that the switched-capacitor circuit 18 switch between the states in the order shown in FIGS. 14-15.

Having described the invention, and a preferred embodiment thereof, what is claimed as new, and secured by letters patent is:

1. An apparatus comprising:
   a switched-capacitor circuit configured to operate in a plurality of switching patterns and to be coupled to a plurality capacitors, the switched-capacitor circuit comprising:
      a first terminal to be coupled to a pre-regulator circuit that is configured to convert an input voltage to a first voltage, wherein the input voltage is an AC voltage and the first voltage is a DC voltage to be received by the first terminal;
      a second terminal to be coupled to an inductor; and
      switching circuitry comprising a first set of switches connected in series between the first terminal and the second terminal and a second set of switches connected in series between the first terminal and the second terminal,
         the first set of switches comprising:
            a first switch coupled to the first terminal,
            a second switch coupled to the first switch and to be coupled to a first capacitor terminal of a first capacitor of the plurality of capacitors and a first capacitor terminal of a second capacitor of the plurality of capacitors,
            a third switch coupled to the second switch, the first capacitor terminal of the second capacitor and the second terminal; and
         the second set of switches comprising:
            a fourth switch coupled to the third switch and the second terminal, and to be coupled to a second capacitor terminal of the first capacitor,
            a fifth switch coupled to the fourth switch and to the second capacitor terminal of the first capacitor; and
            a sixth switch coupled to the fifth switch, the first terminal, and the second capacitor terminal of the second capacitor; and
   a controller configured to control the pre-regulator circuit and configured to control the switched-capacitor circuit to operate in the plurality of switching patterns to cause the first voltage to be transformed to a second voltage at the second terminal, wherein the controller comprises:
      a primary section configured to control a switch configured to selectively pass current through a primary winding of a transformer in the pre-regulator circuit;
      a secondary section configured to control the switched-capacitor circuit; and
      an isolation barrier to separate the secondary section from the primary section.

2. The apparatus of claim 1, wherein the plurality of switching patterns includes a first switching pattern in which the second voltage is related to the first voltage by a first voltage conversion ratio.

3. The apparatus of claim 2, wherein the plurality of switching patterns includes a second switching pattern in which the second voltage is related to the first voltage by a second voltage conversion ratio different than the first voltage conversion ratio.

4. The apparatus of claim 1, wherein the controller is configured to cycle the switched-capacitor circuit between the plurality of switching patterns.

5. The apparatus of claim 4, wherein the plurality of switching patterns is cycled at a frequency selected to cause the second voltage to be related to the first voltage by a particular voltage conversion ratio.

6. The apparatus of claim 1, further comprising the inductor; and
   wherein the inductor and the fourth switch are to be coupled to an output capacitor; and
      an output voltage across the output capacitor is based on the second voltage.

7. The apparatus of claim 1, wherein:
   the controller is further configured to control the pre-regulator to provide fine adjustment of the input voltage; and
   the controller is further configured to control the switched-capacitor circuit to provide coarse adjustment of the first voltage to provide the second voltage.

8. An apparatus comprising:
   a pre-regulator circuit configured to convert an input voltage to a first voltage, wherein the input voltage is an AC voltage and the first voltage is a DC voltage;
   a switched-capacitor circuit configured to operate in a plurality of switching patterns, the switched-capacitor circuit comprising:
      a plurality of capacitors;
      a first terminal coupled to the pre-regulator circuit to receive the first voltage,
      a second terminal to be coupled to an inductor and to provide a second voltage based on the first voltage;

switching circuitry for each of the plurality of capacitors, the switching circuitry comprising:
  a first switch coupled to the first terminal,
  a second switch coupled to the first switch and to a first capacitor terminal of a corresponding capacitor of the plurality of capacitors, and wherein the second switch is directly coupled to the second terminal,
  a third switch directly coupled to the second switch and coupled to a second capacitor terminal of the corresponding capacitor, and to the second terminal, and
  a fourth switch coupled to the third switch and the second capacitor terminal of the capacitor; and
bypass switching circuitry coupled to the first terminal and the second terminal and controllable to selectively bypass the switching circuitry; and
a controller configured to control the pre-regulator circuit and configured to control the switched-capacitor circuit to operate in the plurality of switching patterns to cause the first voltage to be transformed to the second voltage, wherein the controller comprises:
  a primary section configured to control a switch configured to selectively pass current through a primary winding of a transformer in the pre-regulator circuit;
  a secondary section configured to control the switched-capacitor circuit; and
  an isolation barrier configured to separate the secondary section from the primary section.

9. The apparatus of claim 8, wherein the plurality of switching patterns includes a first switching pattern in which the second voltage is related to the first voltage by a first voltage conversion ratio.

10. The apparatus of claim 9, wherein the plurality of switching patterns includes a second switching pattern in which the second voltage is related to the first voltage by a second voltage conversion ratio different than the first voltage conversion ratio.

11. The apparatus of claim 8, wherein the controller is configured to cycle the switched-capacitor circuit between the plurality of switching patterns.

12. The apparatus of claim 11, wherein the switched-capacitor circuit cycles between the plurality of switching patterns at a frequency selected to cause the second voltage to be related to the first voltage by a particular voltage conversion ratio.

13. The apparatus of claim 8 further comprising the inductor and an output capacitor;
  wherein the inductor and the fourth switch are coupled to the output capacitor at the second terminal of the switched-capacitor circuit; and
  wherein an output voltage across the output capacitor is based on the second voltage.

14. An apparatus comprising:
a first controller section of a controller configured to control a switched-capacitor circuit comprising a plurality of capacitors and to operate in a plurality of switching patterns to cause a first voltage to be transformed to a second voltage, wherein:
  the switched-capacitor circuit further comprises:
    a first terminal coupled to a pre-regulator circuit for converting an input voltage to the first voltage, wherein the input voltage is an AC voltage and the first voltage is a DC voltage,
    a second terminal coupled to an inductor and to provide a second voltage based on the first voltage, and
  switching circuity configured to charge and/or discharge each capacitor of the plurality of capacitors based on a switching pattern, the switching circuitry comprising a first set of switches connected in series between the first terminal and the second terminal and a second set of switches connected in series to the second terminal,
    the first set of switches comprising:
      a first switch coupled to the first terminal and to be coupled to a first terminal of a first capacitor of the plurality of capacitors,
      a second switch coupled to the first switch and to the first capacitor terminal of the first capacitor and a first terminal of a second capacitor of the plurality of capacitors,
      a third switch directly coupled to the second switch and to be coupled to a the first capacitor terminal of the second capacitor, and the second terminal, and
    the second set of switches comprising:
      a fourth switch coupled to the third switch and the second terminal, and to be coupled to a second capacitor terminal of the second capacitor;
      a fifth switch coupled to the fourth switch and to the second capacitor terminal of the first capacitor and a second capacitor terminal of the second capacitor; and
      a sixth switch coupled to the fifth switch, the first terminal, and the second capacitor terminal of the first capacitor; and
  wherein the first controller section is separated by an isolation barrier inside the controller from a second controller section of the controller, wherein the second controller section is configured to control a switch configured to selectively pass current through a primary winding of a transformer in the pre-regulator circuit; and
  wherein each switching pattern comprises setting each switch of the first set of switches to either an open state or a closed state and setting each complementary switch of the second to the opposite state.

15. The apparatus of claim 14, wherein:
the pre-regulator circuit is configured to provide fine adjustment of the input voltage; and
the switched-capacitor circuit is configured to provide coarse adjustment of the input voltage.

16. The apparatus of claim 14, wherein the controller is configured to cycle the switched-capacitor circuit between the plurality of switching patterns.

17. The apparatus of claim 16, wherein the controller is configured to cycle between the plurality of switching patterns at a frequency selected to cause the second voltage to be related to the first voltage by a particular voltage conversion ratio.

18. The apparatus of claim 14, further comprising the switched-capacitor circuit, the inductor, and an output capacitor;
  wherein the inductor and the fourth switch are coupled to the output capacitor at the second terminal of the switched-capacitor circuit; and
  wherein an output voltage across the output capacitor is based on the second voltage.

19. A method comprising:
- converting, using a pre-regulation circuit, an input voltage comprising an AC voltage to a first voltage comprising a DC voltage;
- receiving, at a first terminal of a switched-capacitor circuit comprising a plurality of capacitors, the first voltage;
- cycling the switched-capacitor circuit between a plurality of switching patterns to cause the first voltage to be transformed by the switched-capacitor circuit to a second voltage, wherein controlling the switched-capacitor circuit comprises:
  - controlling switching circuitry associated with a first capacitor of the plurality of capacitors and a second capacitor of the plurality of capacitors, wherein the switching circuitry comprises a first set of switches connected in series between the first terminal and the second terminal and a second set of switches connected in series to the second terminal,
  - the first set of switches comprising:
    - a first switch coupled to the first terminal,
    - a second switch coupled to the first switch, a first capacitor terminal of the first capacitor, and a first capacitor terminal of the second capacitor,
    - a third switch coupled to the second switch, the first capacitor terminal of the second capacitor, and the second terminal;
  - the second set of switches comprising:
    - a fourth switch coupled to the third switch and coupled to a second capacitor terminal of the second capacitor and the second terminal, and
    - a fifth switch coupled to the fourth switch, the second capacitor terminal of the first capacitor, and the second capacitor terminal of the second capacitor;
    - a sixth switch coupled to the fifth switch, the first terminal, and the second capacitor terminal of the second capacitor; and
  - executing a switching pattern comprising:
    - setting each switch of the first set of switches to either an open state or a closed state; and
    - setting each complementary switch of the second set of switches to the opposite state; and
  - providing, at the second terminal of the switched-capacitor circuit, an output voltage based on the second voltage; and
- wherein controlling the switched-capacitor circuit further comprises controlling the switched-capacitor circuit via a first controller section of a controller and controlling the pre-regulation circuit via a second controller section of the controller that is separated from the first controller section by an isolation barrier.

20. The method of claim 19, wherein cycling the switched-capacitor circuit between the plurality of switching patterns comprises cycling at a frequency selected to cause the second voltage to be related to the first voltage by a particular voltage conversion ratio.

21. The apparatus of claim 1, wherein the isolation barrier is inside the controller.

22. The apparatus of claim 8, wherein the isolation barrier is inside the controller.

23. The apparatus of claim 1, wherein the apparatus is an AC-to-DC converter;
- wherein the secondary section of the controller controls the switched-capacitor circuit to transition the first switch, the second switch, the third switch, the fourth switch, the fifth switch, and the sixth switch between a first configuration and a second configuration, as a result of which the plurality of capacitors are to be interconnected in a corresponding first arrangement and a corresponding a second arrangement, resulting in movement of charge between capacitors to provide coarse adjustment of the second voltage;
- wherein the primary section of the controller is configured to control the pre-regulator circuit to provide fine adjustment of the first voltage; and
- wherein the controller is further configured to alter at least an operation of one or more switches in at least one of the pre-regulator circuit and the switched-capacitor circuit, based at least in part on one or more measurements of a voltage and/or a current within the AC-to-DC converter.

24. The apparatus of claim 14, wherein the apparatus is an AC-to-DC converter;
- wherein the first controller section of the controller controls the switched-capacitor circuit to transition the first switch, the second switch, the third switch, the fourth switch, the fifth switch, and the sixth switch between a first configuration and a second configuration, as a result of which the plurality of capacitors are to be interconnected in a corresponding first arrangement and a corresponding a second arrangement, resulting in movement of charge between capacitors to provide coarse adjustment of the second voltage;
- wherein the second controller section of the controller is configured to control the pre-regulator circuit to provide fine adjustment of the first voltage;
- wherein the controller is further configured to alter at least an operation of one or more switches in at least one of the pre-regulator circuit and the switched-capacitor circuit, based at least in part on one or more measurements of a voltage and/or a current within the AC-to-DC converter.

25. The apparatus of claim 1, wherein each switching pattern comprises setting each switch of the first set of switches to either an open state or a closed state and setting each complementary switch of the second set of switches to an opposite state.

26. The apparatus of claim 8, wherein the switching circuitry comprises first switching circuitry comprising the first switch, the second switch, the third switch, and the fourth switch associated with a first capacitor of the plurality of capacitors; and second switching circuitry comprising the first switch, the second switch, the third switch, and the fourth switch associated with a second capacitor of the plurality of capacitors.

27. The apparatus of claim 26, wherein the first switch and the second switch of the first switching circuitry and the first switch and the second switch of the second switching circuitry are coupled in parallel between the first terminal and the second terminal.

28. The apparatus of claim 26, wherein the third switch and the fourth switch of the first switching circuitry and the third switch and the fourth switch of the second switching circuitry are coupled in parallel between the first terminal and the second terminal.

29. The apparatus of claim 26, wherein each switching pattern comprises setting each switch of the first switching circuitry to either an open state or a closed state and setting each complementary switch of the second switching circuitry to an opposite state.

30. The apparatus of claim 1, wherein the first series of switches further comprises a seventh switch coupled between the first terminal and the first switch and to be coupled to a first terminal of a third capacitor of the plurality of capacitors; and wherein the second series of switches further comprises an eighth switch coupled between the first terminal and the sixth switch and to be coupled to a second terminal of the third capacitor of the plurality of capacitors.

31. The apparatus of claim 1, wherein the switched-capacitor network further comprises bypass switching circuitry coupled to the first terminal and the second terminal and controllable to selectively bypass the switching circuitry.

32. The apparatus of claim 14, wherein the switching circuitry further comprises a seventh switch coupled between the first terminal and the first switch and to be coupled to a first terminal of a third capacitor of the plurality of capacitors; and an eighth switch coupled between the first terminal and the sixth switch and to be coupled to a second terminal of the third capacitor of the plurality of capacitors.

33. The apparatus of claim 14, wherein the switched-capacitor network further comprises bypass switching circuitry coupled to the first terminal and the second terminal and controllable to selectively bypass the switching circuitry.

* * * * *

UNITED STATES PATENT AND TRADEMARK OFFICE
CERTIFICATE OF CORRECTION

| | | |
|---|---|---|
| PATENT NO. | : 12,244,242 B2 | Page 1 of 1 |
| APPLICATION NO. | : 17/646875 | |
| DATED | : March 4, 2025 | |
| INVENTOR(S) | : David M. Giuliano and David Kunst | |

It is certified that error appears in the above-identified patent and that said Letters Patent is hereby corrected as shown below:

In the Specification

Column 1, Lines 6-7, change "U.S. patent application Ser. No." to --U.S. Patent Application No.--.

Column 6, Line 61, change "side of the transformer TO" to --side of the transformer T0--.

Column 6, Line 63, change "the diode DO is off" to --the diode D0 is off--.

Column 6, Line 63, change "the diode DO is on." to --the diode D0 is on.--.

Column 8, Line 44, change "is fora nominal die" to --is for a nominal die--.

Column 8, Line 57, change "an output voltage T72" to --an output voltage V2--.

Signed and Sealed this
Twenty-second Day of April, 2025

Coke Morgan Stewart
*Acting Director of the United States Patent and Trademark Office*